US011316757B1

(12) United States Patent
Eliav et al.

(10) Patent No.: US 11,316,757 B1
(45) Date of Patent: Apr. 26, 2022

(54) SYSTEM, METHOD, AND COMPUTER PROGRAM FOR CONSUMER REQUIREMENT BASED MANAGEMENT FOR PHYSICAL EDGE DEPLOYMENT OF AN APPLICATION

(71) Applicant: Amdocs Development Limited, Limassol (CY)

(72) Inventors: Nagina Eliav, Even Yehuda (IL); Thomas Leonard Trevor Plestid, Chelsea (CA); Leonid Shamis, Melbourne (AU); Sagar Tayal, Ambala (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 88 days.

(21) Appl. No.: 16/909,848

(22) Filed: Jun. 23, 2020

(51) Int. Cl.
*H04L 41/5041* (2022.01)
*G06F 8/60* (2018.01)

(52) U.S. Cl.
CPC ............ *H04L 41/5045* (2013.01); *G06F 8/60* (2013.01)

(58) Field of Classification Search
CPC ................................ H04L 41/5045; G06F 8/60
USPC ......................................................... 709/223
See application file for complete search history.

(56) References Cited

U.S. PATENT DOCUMENTS

| | | | |
|---|---|---|---|
| 10,778,724 B1* | 9/2020 | Miriyala | H04L 63/20 |
| 11,025,711 B2* | 6/2021 | Calmon | G06F 9/5077 |
| 11,080,428 B2* | 8/2021 | Gustafsson | G06F 21/604 |
| 2015/0324182 A1 | 11/2015 | Barros et al. | |
| 2019/0132197 A1 | 5/2019 | Saxena et al. | |
| 2019/0229990 A1 | 7/2019 | Patel et al. | |
| 2019/0377838 A1 | 12/2019 | Wang | |
| 2020/0228602 A1* | 7/2020 | Spoczynski | G06F 9/5072 |
| 2020/0236038 A1* | 7/2020 | Liu | H04L 41/0836 |
| 2020/0285523 A1* | 9/2020 | Guim Bernat | G06F 9/4843 |
| 2020/0288296 A1* | 9/2020 | Fiorese | H04L 41/0823 |
| 2020/0296155 A1* | 9/2020 | McGrath | G06F 9/5027 |
| 2020/0374974 A1* | 11/2020 | Sun | H04L 63/105 |
| 2020/0389410 A1* | 12/2020 | Guim Bernat | H04L 49/90 |
| 2021/0034423 A1* | 2/2021 | Hallur | G06F 9/5016 |

(Continued)

FOREIGN PATENT DOCUMENTS

CN 110380891 A 10/2019

OTHER PUBLICATIONS

Ashkan Yousefpour, Caleb Fung, Tam Nguyen, Krishna Kadiyala, Fatemeh Jalali, Amirreza Niakanlahiji, Jian Kong, Jason P. Jue, All one needs to know about fog computing and related edge computing paradigms: A complete survey, Journal of Systems Architecture, vol. 98, 2019, pp. 289-330. (Year: 2019).*

(Continued)

*Primary Examiner* — Melvin H Pollack
(74) *Attorney, Agent, or Firm* — Zilka-Kotab, P.C.

(57) ABSTRACT

As described herein, a system, method, and computer program provide consumer requirement based management for a physical edge deployment of an application. In use, a communication service provider received, from a third party, a definition of one or more service requirements for an application deployed within a network of the communication service provider. Further, the communication service provider manages a physical edge deployment of the application within the network for the third party to satisfy the one or more service requirements of the third party.

22 Claims, 6 Drawing Sheets

(56) References Cited

U.S. PATENT DOCUMENTS

| | | | |
|---|---|---|---|
| 2021/0075866 A1* | 3/2021 | Naylor | H04L 43/10 |
| 2021/0126840 A1* | 4/2021 | Venkataramu | H04L 41/5041 |
| 2021/0132935 A1* | 5/2021 | Dinh | G06F 8/71 |
| 2021/0208943 A1* | 7/2021 | Baughman | G06F 8/61 |
| 2021/0216567 A1* | 7/2021 | Boychev | G06F 16/26 |
| 2021/0248056 A1* | 8/2021 | Ma | G06F 8/61 |
| 2021/0250250 A1* | 8/2021 | Reznik | H04L 41/5019 |
| 2021/0263779 A1* | 8/2021 | Haghighat | G06F 11/3409 |
| 2021/0286638 A1* | 9/2021 | Fan | G06F 9/45558 |

OTHER PUBLICATIONS

P. Mach and Z. Becvar, "Mobile Edge Computing: A Survey on Architecture and Computation Offloading," in IEEE Communications Surveys & Tutorials, vol. 19, No. 3, pp. 1628-1656, thirdquarter 2017, doi: 10.1109/COMST.2017.2682318. (Year: 2017).*

Theophilus Benson, Aditya Akella, Anees Shaikh, and Sambit Sahu. 2011. CloudNaaS: a cloud networking platform for enterprise applications. In <i>Proceedings of the 2nd ACM Symposium on Cloud Computing</i> (<i>SOCC '11</i>). Association for Computing Machinery, New York, NY, USA, Article 8, 1-13. (Year: 2011).*

Xiaolong Xu, Xuyun Zhang, Maqbool Khan, Wanchun Dou, Shengjun Xue, Shui Yu, A balanced virtual machine scheduling method for energy-performance trade-offs in cyber-physical cloud systems, Future Generation Computer Systems, vol. 105, 2020, pp. 789-799. (Year: 2020).*

J. Pan and J. McElhannon, "Future Edge Cloud and Edge Computing for Internet of Things Applications," in IEEE Internet of Things Journal, vol. 5, No. 1, pp. 439-449, Feb. 2018, doi: 10.1109/JIOT.2017.2767608. (Year: 2018).*

T. Taleb, K. Samdanis, B. Mada, H. Flinck, S. Dutta and D. Sabella, "On Multi-Access Edge Computing: A Survey of the Emerging 5G Network Edge Cloud Architecture and Orchestration," in IEEE Communications Surveys & Tutorials, vol. 19, No. 3, pp. 1657-1681, thirdquarter 2017. (Year: 2017).*

Hu, Y. C., Patel, M., Sabella, D., Sprecher, N., & Young, V. (2015). Mobile edge computing—A key technology towards 5G. ETSI white paper, 11(11), 1-16. (Year: 2015).*

Sundaramurthy, S., "5G—OOF (ONAP Optimization Framework) and PCI (Physical Cell ID) Optimization," Confluence, Oct. 4, 2019, 4 pages, retrieved from https://wiki.onap.org/display/DW/5G+-+OOF+%28ONAP+Optimization+Framework%29+and+PCI+%28Physical+Cell+ID%29+Optimization.

Wilkinson, A., "StarlingX Far Edge Distributed Cloud," Akraino Edge Stack, Feb. 3, 2020, 7 pages, retrieved from https://wiki.akraino.org/display/AK/StarlingX+Far+Edge+Distributed+Cloud.

Koerv, J., "Time-Critical Edge Compute," Akraino Edge Stack, May 13, 2020, 7 pages, retrieved from https://wiki.akraino.org/display/AK/Time-Critical+Edge+Compute.

* cited by examiner

SYSTEM, METHOD, AND COMPUTER PROGRAM FOR CONSUMER REQUIREMENT BASED MANAGEMENT FOR PHYSICAL EDGE DEPLOYMENT OF AN APPLICATION

FIELD OF THE INVENTION

The present invention relates to edge computing in a network environment.

BACKGROUND

Edge computing generally refers to a distributed computing model where computing resources are located in close proximity to the applications and/or systems that utilize those resources. This model is generally employed to shorten communication distances, which improves response times and reduces network bandwidth consumption. For example, an application that provides certain computational functions may be migrated towards a source that consumes the output of the application.

Currently, however, techniques are limited with respect to evaluating the effectiveness of the placement of a computing resource. For example, current techniques do not consider requirements for particular consumers with regards to a computing resource, nor do current techniques evaluate the computing resource with regards to the requirements or provide processes that address situations when the requirements are not met. There is thus a need for addressing these and/or other issues associated with the prior art.

SUMMARY

As described herein, a system, method, and computer program provide consumer requirement based management for a physical edge deployment of an application. In use, a communication service provider received, from a third party, a definition of one or more service requirements for an application deployed within a network of the communication service provider. Further, the communication service provider manages a physical edge deployment of the application within the network for the third party to satisfy the one or more service requirements of the third party.

DETAILED DESCRIPTION

Figure 1:
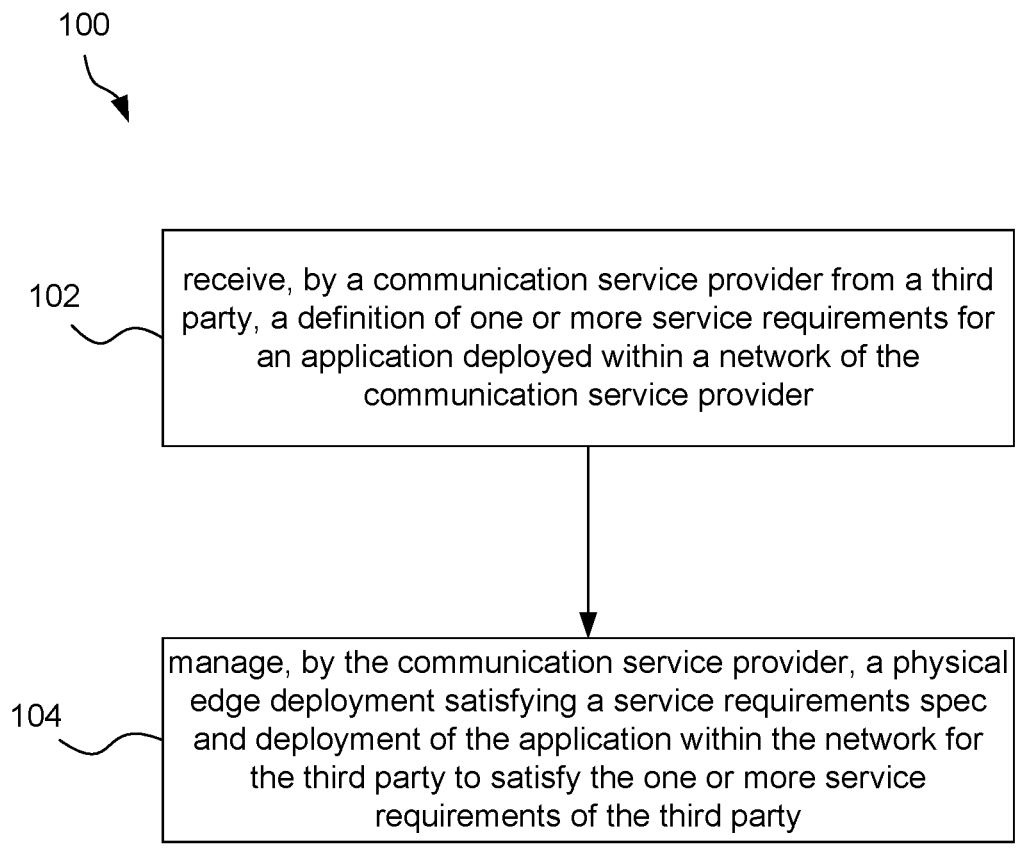
FIG. 1 illustrates a method for consumer requirement based management for a physical edge deployment of an application, in accordance with one embodiment.

FIG. 1 illustrates a method 100 for consumer requirement based management for a physical edge deployment of an application, in accordance with one embodiment. The method 100 may be performed by a communication service provider system. The communication service provider system may be any system (e.g. computing device) of a communication service provider. For example, the method 100 may be performed in the context of one or more of the devices described below with reference to FIGS. 5 and/or 6.

In the context of the present description, the communication service provider provides one or more applications for use (consumption) by one or more consumers (third parties). The applications may include functionality that provides communication services to the consumers. For example, the applications may be virtual network functions (NVFs) of the communication service provider. To this end, the communication service provider may provide a communication service to a consumer using an application of the communication service provider. The applications may be deployed (e.g. installed, executed, etc.) in a distributed network environment of the communication service provider, such as a multi-access edge compute (MEC) environment, as described below. In various embodiments, the consumers may be hardware manufacturers, cloud services, or any other entities that use (consume) functionality of the application.

As shown in operation 102, the communication service provider receives, from a third party, a definition of one or more service requirements for an application deployed within a network of the communication service provider. In one embodiment, the definition of the one or more service requirements may be received from the third party with an order for (subscription to) the application, such as an order for a service provided via the application. The application may already be deployed within the network for use by other parties, in one embodiment, but may not necessary be deployed in the network yet for specific use by the third party.

In one embodiment, the service requirements may relate to an operation of the application with respect to the consumer. For example, the service requirements may include a maximum latency allowed to be experienced by the consumer (e.g. low latency requirement). As another example, the service requirements may include a security requirement, such as a certain level or type of security employed by the application.

In another embodiment, the service requirements may relate to an environment in which the application is deployed. For example, the service requirements may include a hardware acceleration requirement (e.g. requirement for a field-programmable gate array (FPGA) optimized for radio access such as for virtual radio access network (RAN) software, or other unanticipated applications requiring acceleration). As another example, the service requirements may include a security requirement (e.g. trusted execution environments). As yet another example, the service requirements may include an artificial intelligence requirement (e.g. present of graphics processing units (GPUs)). Of course, however, the service requirements may include requirements for any aspect related to the application.

As an option, the service requirements may each be defined as a service score. Thus, the service requirements may be measurable against actual service measurements. Further, the service requirements may be stored in a policy associated with the third party, such that the service requirements may be specifically applicable to consumption of the application by the third party (and not necessarily applicable to consumption of the application by other parties).

Further, as shown in operation 104, the communication service provider manages a physical edge deployment of the application within the network for the third party to satisfy the one or more service requirements of the third party. This may include managing a physical edge deployment (e.g. satisfying the service requirements spec) and deployment of the application within the network for the third party to satisfy the one or more service requirements of the third party. For example, the communication service provider may manage deployment of an instance of the application to a physical network edge for use by the third party, based on the service requirements (e.g. stored in the policy) of the third party. As another example, the communication service provider may create an optimization plan for deploying the application, based on the one or more service requirements of the third party.

In one embodiment, managing the physical edge deployment of the application may include, responsive to receiving the service requirements from the third party, deploying the application to a first physical network edge that satisfies the service requirements. The first physical network edge may be selected by the communication service provider from a plurality of available network edges. The third party may then utilize the application at the first physical network edge.

In another embodiment, managing the physical edge deployment of the application may include, after deploying the application to the first physical network edge, redeploying the application to a second physical network edge that satisfies the one or more service requirements when the one or more service requirements are no longer satisfied at the first network edge. The second physical network edge may be selected by the communication service provider from the plurality of available network edges. In this embodiment, the third party may then utilize the application at the second physical network edge.

To this end, the method 100 may be implemented to allow third parties to set requirements for applications deployed by the communication service provider for use by the third parties. The communication service provider may then ensure that an application instance deployed for a particular third party meets the requirements of that particular third party. Accordingly, the method 100, as described above, may be performed for each third parties of a plurality of different third parties, each having their own requirements for the application and possibly other applications of the communication service provider.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
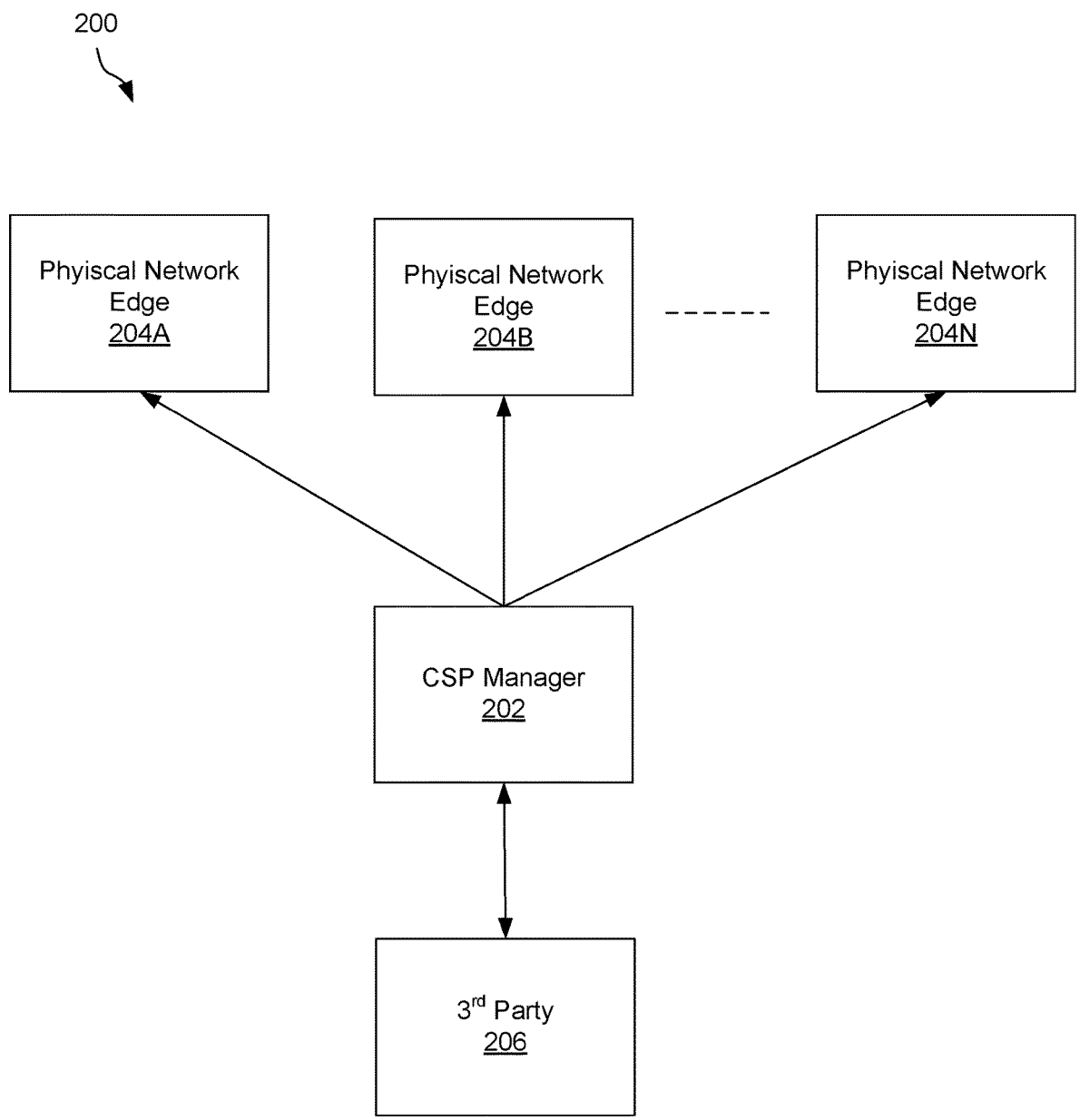
FIG. 2 illustrates a system for consumer requirement based management for a physical edge deployment of an application, in accordance with one embodiment.

FIG. 2 illustrates a system 200 for consumer requirement based management for a physical edge deployment of an application, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a communication service provider manager 202 (or any other module, application, hardware device, etc.) of a communication service provider communicates with a plurality of physical network edges 204A-N. Each physical network edge 204A-N is a physical edge computing device operating at a different location within the network of the communication service provider. Each physical network edge 204A-N may include a processing resource (e.g. hardware processor) and a memory resource.

The communication service provider manager 202 communicates with the physical network edges 204A-N via the network. In one embodiment, the communication service provider manager 202 communicates with the physical network edges 204A-N by deploying applications, and optionally other resources, to the physical network edges 204A-N.

In another embodiment, the communication service provider manager 202 communicates with the physical network edges 204A-N by retrieving service measurements (e.g. latency, etc.) from the physical network edges 204A-N. For example, the communication service provider manager 202 may provide "hooks" to the physical network edges 204A-N for obtaining the service measurements. The service measurements may be obtained using EnodeB traces and/or probe traces for backhaul and core latency, from data center/assets information, or in any other desired manner.

As also shown, the communication service provider manager 202 communicates with a third party 206. The third party 206 is a consumer of an application of the communication service provider. For example, the third party 206 may be a customer of the communication service provider. In one embodiment, the communication service provider manager 202 may communicate with the third party 206 via the network of the communication service provider. In the context of the present system 200, the communication service provider manager 202 communicates with the third party 206 to receive service requirements of the third party 206 for an application deployed by the communication service provider.

To this end, the system 200 operates such that the communication service provider manager 202 receives, from the third party 206, a definition of one or more service requirements for an application deployed within a network of the communication service provider. Further, the system 200 operates such that the communication service provider manager 202 manages a deployment of the application to a select one of the physical network edges 204A-N within the network for the third party 206 to satisfy the one or more service requirements of the third party 206.

Figure 3:
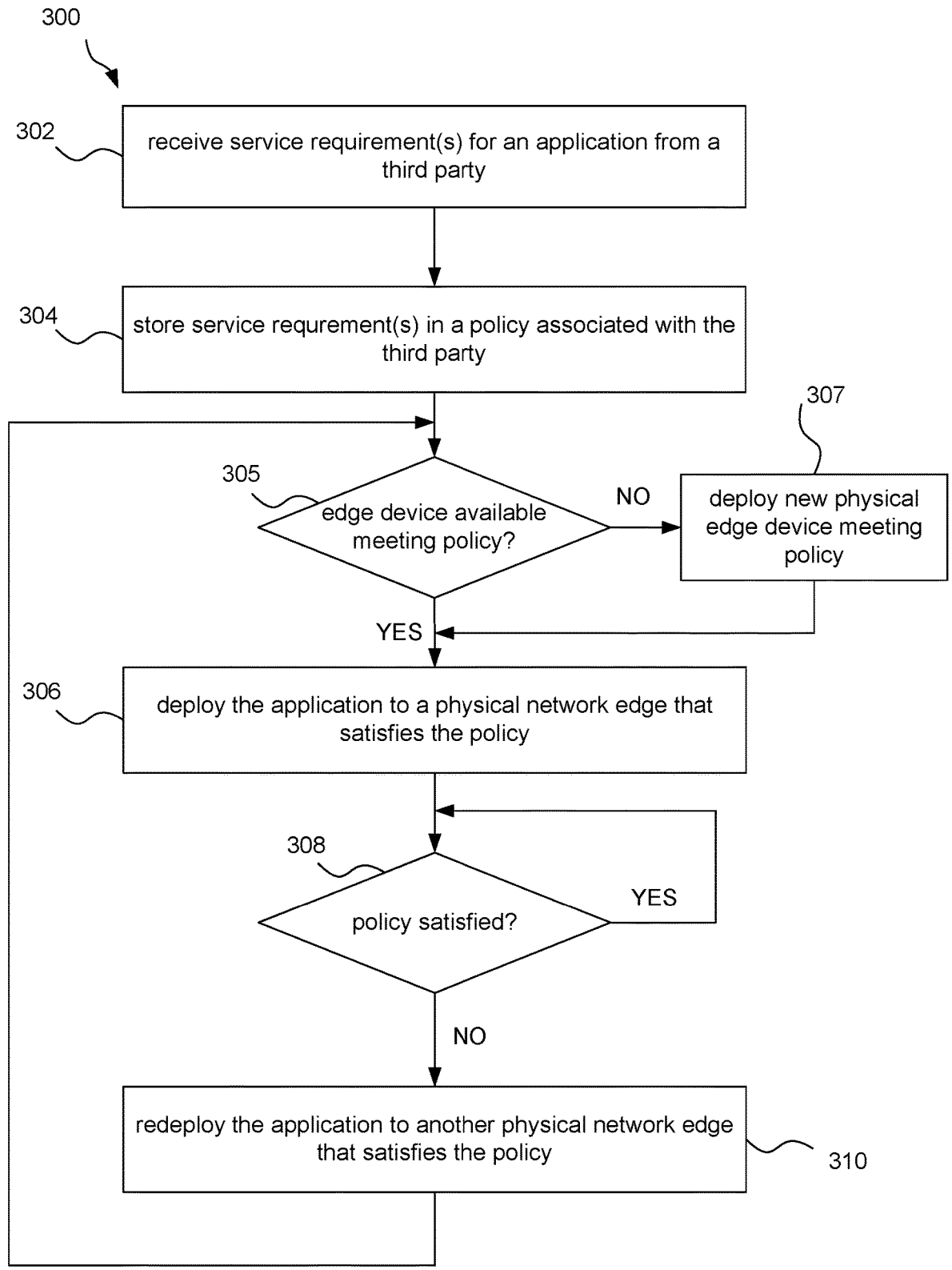
FIG. 3 illustrates a method for physical network edge redeployment of an application based on consumer requirements, in accordance with one embodiment.

FIG. 3 illustrates a method 300 for physical network edge redeployment of an application based on consumer requirements, in accordance with one embodiment. The method 300 may be carried out in the context of the system 200 of FIG. 2, for example. For example, the method 300 may be carried out by the communication service provider manager 202 of FIG. 2.

In operation 302, a definition is received from a third party which indicates one or more service requirements for an application deployed within a network of the communication service provider. The definition may be received via a user interface (GUI) of the communication service provider. In one embodiment, the definition may be received with an order for a service associated with the application, to be used by the third party.

In operation 304, the service requirements are stored in a policy associated with the third party. For example, the policy may be stored in a data structure of the communication service provider with a corresponding indicator of the third party to which the policy applies.

In operation 305, it is determined whether an edge device is available meeting the policy. When it is determined in decision 305 that an edge device is available meeting the policy, the method proceeds to operation 306, described below. When it is determined in decision 305 that an edge device is not available meeting the policy, then a new physical edge device meeting the policy is deployed, as shown in operation 307, after which the method proceeds to operation 306.

In operation 306, the application is deployed to a physical network edge that satisfies the policy (i.e. the service requirements). The communication service provider may select a particular physical network edge within the network of the communication service provider that satisfies the policy associated with the third party. The application (e.g. an instance thereof) may then be deployed to selected physical network edge for use by the third party.

In decision 308, it is determined if the policy is still satisfied. For example, decision 308 may occur some defined time after the application is deployed to the physical network edge to determine whether execution of the application on the physical network edge still satisfies the policy. The determination may be made based on service measurements provided to the communication service provider by the physical network edge, in one embodiment. The service measurements (e.g. with respect to latency) may be obtained with respect to the third party, in some embodiments.

In an embodiment, the communication service provider may evaluate the service measurements of the physical network edge to determine whether execution of the application on the physical network edge still satisfies the policy. For example, where the service requirements are defined as service scores, the communication service provider may evaluate the service measurements with respect to the service scores.

When it is determined in decision 308 that the policy is still satisfied, the method 300 returns to decision 308 after some time. In this way, the method 300 may periodically verify that the policy is still satisfied for the third party. However, when it is determined in decision 308 that the policy is not satisfied (i.e. execution of the application on the physical network edge no longer satisfies the policy), then in operation 310 the application is redeployed to another physical network edge that satisfies the policy. The communication service provider may select the other physical network edge within the network that satisfies the policy associated with the third party. The application (e.g. an instance thereof) may then be redeployed to the other selected physical network edge for use by the third party. To this end, the application may be provided for use by the third party while ensuring that the service requirements of the third party are met.

Figure 4:
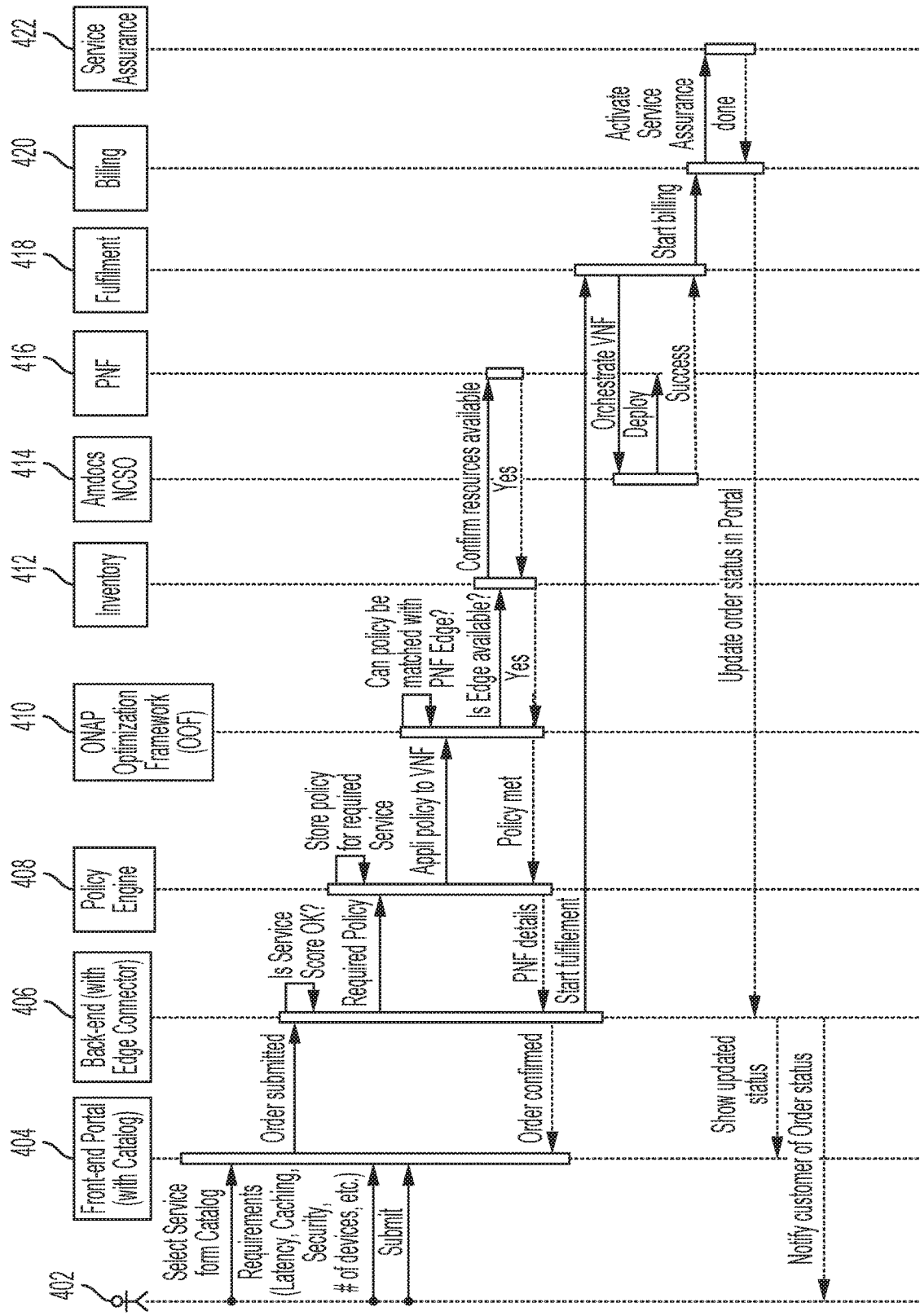
FIG. 4 illustrates a system flow diagram for processing a consumer order for an application according to consumer requirements for the application, in accordance with one embodiment.

FIG. 4 illustrates a system flow diagram for processing a consumer order for an application according to consumer requirements for the application, in accordance with one embodiment. The flow diagram may be carried out in the context of the system 200 of FIG. 2, for example.

As shown, a third party 402 selects a service from a catalog of a front-end portal 404 of a communication service provider. The service is provided by the communication service provider using an application of the communication service provider. Along with selection of the service, the third party 402 selects service requirements for the service. The selected service and service requirements are submitted via the front-end portal 404 to a back-end 406 of the communication service provider which includes an edge connector (i.e. the communication service provider manager 202 of FIG. 2).

The back-end 406 determines whether a service score for the service requirements is acceptable (e.g. within a defined range). When the service score for the service requirements is acceptable, the back-end 406 forwards the service requirements as a policy to a policy engine 408 of the communication service provider. The policy engine 408 stores the policy in association with an indicator of the third party 402.

The policy is forwarded to an Open Network Automation Platform (ONAP) optimization framework (OOF) 410 which determines whether any physical network edge satisfies the policy. The OOF 410 then requests from an inventory module 412 of the communication service provider whether the physical network edge determined to satisfy the policy is available. The inventory module 412 communicates with a physical network function (PNF) 416 to confirm that resources of the physical network edge are available, for driving subsequent newly required physical edge devices if necessary.

When the PNF 416 determines that resources of the physical network edge are available, the confirmation is provided back to the front-end portal 404, as shown to confirm the order with the third party 402. Fulfillment of the service for the third party is then initiated by the back-end 406 communicating with a fulfillment module 418 of the communication service provider. The fulfillment module 418 orchestrates a virtual network function (VNF) as an instance of the application with a Network Cloud Service Orchestrator (NCSO) 414, which then deploys the instance of the application to the physical network edge using the PNF 416.

After successful deployment, the fulfillment module 418 initiates billing to a billing module 420 of the communication service provider. The billing module 420 activates service assurance through a service assurance module 422 of the communication service provider. The service assurance module 422 manages physical edge deployment of the application for the third party 402 based on the policy. In particular, the service assurance module 422 ensures that the policy is met, and redeploys the application to another physical network edge when necessary to satisfy the policy. Further, the third party 402 is notified of the deployment via an order status.

Figure 5:
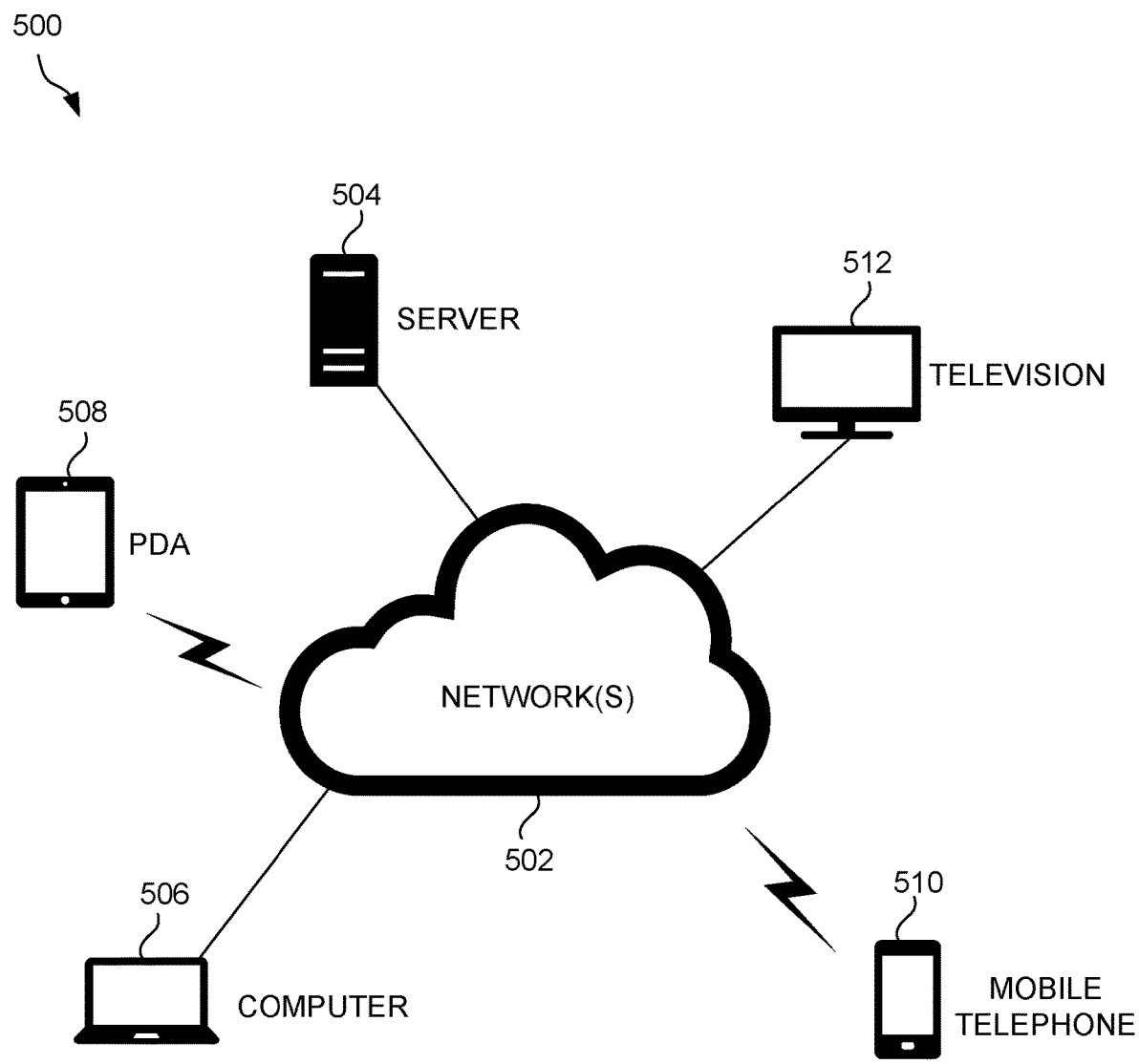
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
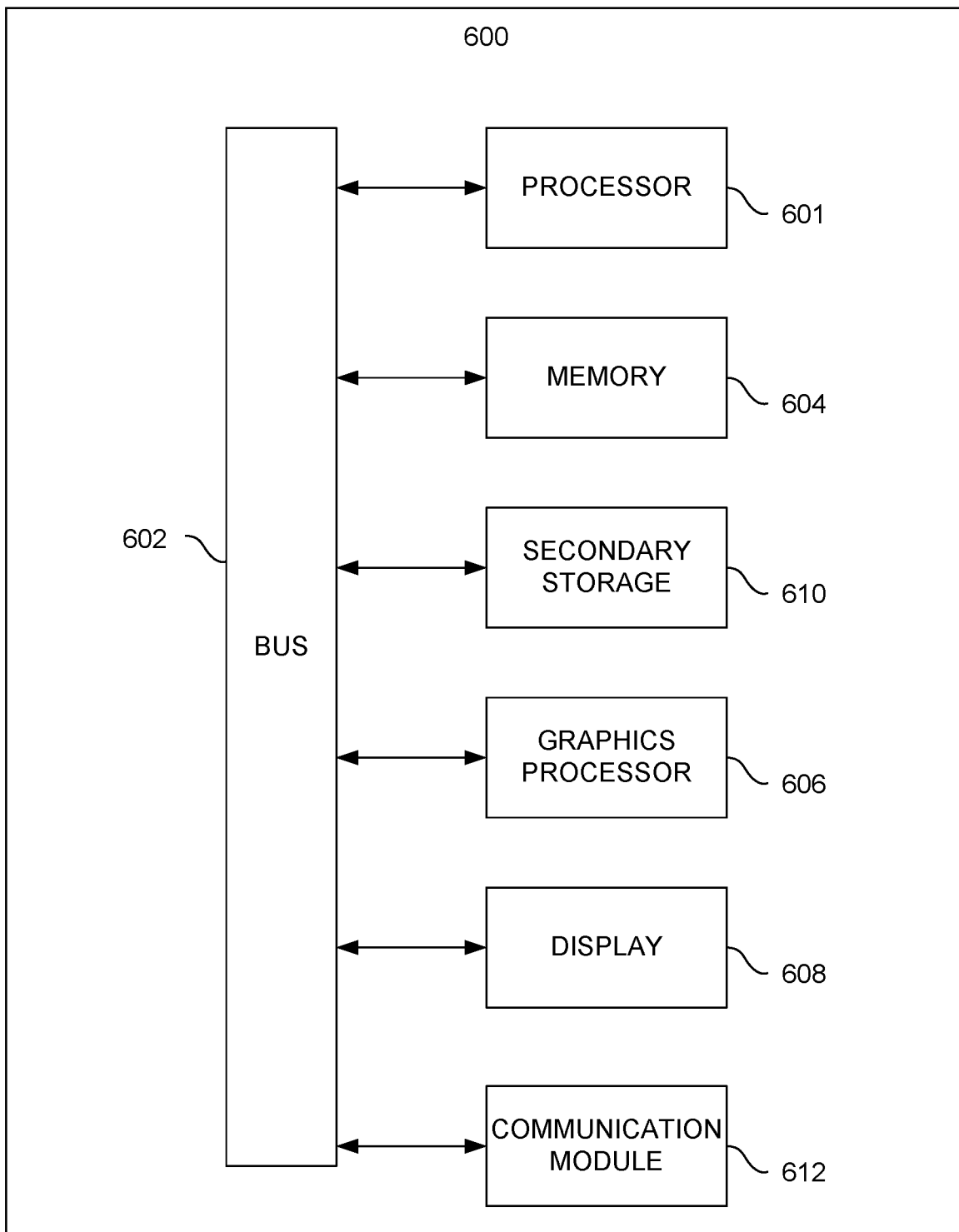
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   receiving, by a communication service provider from a third party, a definition of one or more service requirements for an application deployed within a network of the communication service provider; and
   managing, by the communication service provider, a physical edge deployment of the application within the network for the third party to satisfy the one or more service requirements of the third party, including:
      evaluating service measurements of each of a plurality of physical network edges at different locations within the network,
      determining whether the evaluated service measurements of any of the plurality of physical network edges that meet the one or more service requirements for the application,
      responsive to determining that the evaluated service measurements of one of the plurality of physical network edges meet the one or more service requirements for the application, deploying the application to the one of the plurality of physical network edges,
      after deploying the application to the one of the plurality of physical network edges, re-evaluating the service measurements of each of the plurality of physical network edges,
      determining whether the re-evaluated service measurements of the one of the plurality of physical network edges meet the one or more service requirements for the application,
      responsive to determining that the re-evaluated service measurements of the one of the plurality of physical network edges does not meet the one or more service requirements for the application, determining whether the re-evaluated service measurements of any other one of the plurality of physical network edges meet the one or more service requirements for the application,
      responsive to determining that the re-evaluated service measurements of another one of the plurality of physical network edges meet the one or more service requirements for the application, deploying the application to the other one of the plurality of physical network edges having the re-evaluated service measurements that meet the one or more service requirements for the application.

2. The non-transitory computer readable medium of claim 1, wherein the third party is a hardware manufacturer that is a consumer of functionality of the application.

3. The non-transitory computer readable medium of claim 1, wherein the third party is a cloud service.

4. The non-transitory computer readable medium of claim 1, wherein the third party is a consumer of functionality of the application.

5. The non-transitory computer readable medium of claim 1, wherein the definition of the one or more service requirements are received from the third party by the communication service provider with an order for the application.

6. The non-transitory computer readable medium of claim 1, wherein the one or more service requirements include a low latency requirement.

7. The non-transitory computer readable medium of claim 1, wherein the one or more service requirements include a security requirement.

8. The non-transitory computer readable medium of claim 1, wherein the one or more service requirements include an artificial intelligence requirement.

9. The non-transitory computer readable medium of claim 1, wherein the one or more service requirements include a hardware acceleration requirement.

10. The non-transitory computer readable medium of claim 9, wherein the hardware acceleration is in the form of a field-programmable gate array (FPGA) optimized for radio access, or other unanticipated applications requiring acceleration.

11. The non-transitory computer readable medium of claim 1, wherein the one or more service requirements include a caching requirement.

12. The non-transitory computer readable medium of claim 1, further comprising:
   storing the one or more service requirements in a policy associated with the third party.

13. The non-transitory computer readable medium of claim 1, wherein the receiving and the managing are performed for each of a plurality of different third parties.

14. A method, comprising:
   receiving, by a communication service provider from a third party, a definition of one or more service requirements for an application deployed within a network of the communication service provider; and
   managing, by the communication service provider, a physical edge deployment of the application within the network for the third party to satisfy the one or more service requirements of the third party, including:
      evaluating service measurements of each of a plurality of physical network edges at different locations within the network,
      determining whether the evaluated service measurements of any of the plurality of physical network edges that meet the one or more service requirements for the application,
      responsive to determining that the evaluated service measurements of one of the plurality of physical network edges meet the one or more service requirements for the application, deploying the application to the one of the plurality of physical network edges,
      after deploying the application to the one of the plurality of physical network edges, re-evaluating the service measurements of each of the plurality of physical network edges, determining whether the re-evaluated service measurements of the one of the plurality of physical network edges meet the one or more service requirements for the application, responsive to determining that the re-evaluated service measurements of the one of the plurality of physical network edges does not meet the one or more service requirements for the application, determining whether the re-evaluated service measurements of any other one of the plurality of physical network edges meet the one or more service requirements for the application, responsive to determining that the re-evaluated service measurements of another one of the plurality of physical network edges meet the one or more service requirements for the application, deploying the application to the other one of the plurality of physical network edges having the re-evaluated service measurements that meet the one or more service requirements for the application.

15. A communication service provider system, comprising:

a non-transitory memory storing instructions; and one or more processors in communication with the non-transitory memory that execute the instructions to perform a method comprising:

receiving, from a third party, a definition of one or more service requirements for an application deployed within a network of the communication service provider system; and managing a physical edge deployment of the application within the network for the third party to satisfy the one or more service requirements of the third party including:

evaluating service measurements of each of a plurality of physical network edges at different locations within the network, determining whether the evaluated service measurements of any of the plurality of physical network edges that meet the one or more service requirements for the application, responsive to determining that the evaluated service measurements of one of the plurality of physical network edges meet the one or more service requirements for the application, deploying the application to the one of the plurality of physical network edges, after deploying the application to the one of the plurality of physical network edges, re-evaluating the service measurements of each of the plurality of physical network edges, determining whether the re-evaluated service measurements of the one of the plurality of physical network edges meet the one or more service requirements for the application, responsive to determining that the re-evaluated service measurements of the one of the plurality of physical network edges does not meet the one or more service requirements for the application, determining whether the re-evaluated service measurements of any other one of the plurality of physical network edges meet the one or more service requirements for the application, responsive to determining that the re-evaluated service measurements of another one of the plurality of physical network edges meet the one or more service requirements for the application, deploying the application to the other one of the plurality of physical network edges having the re-evaluated service measurements that meet the one or more service requirements for the application.

16. The non-transitory computer readable medium of claim 1, wherein the one or more service requirements are each defined as a service score that is measurable against actual service measurements obtained for each of the plurality of physical network edges.

17. The non-transitory computer readable medium of claim 1, wherein the application is deployed to the one of the plurality of physical network edges for use by the third party, and wherein the application is deployed to the other one of the plurality of physical network edges for use by the third party.

18. The non-transitory computer readable medium of claim 1, wherein deploying the application includes deploying an instance of the application for the third party.

19. The non-transitory computer readable medium of claim 18, wherein a virtual network function is deployed as the instance of the application.

20. The non-transitory computer readable medium of claim 1, wherein the plurality of physical network edges are physical edge computing devices operating at different locations within the network.

21. The non-transitory computer readable medium of claim 1, further comprising:

responsive to determining that the evaluated service measurements of none of the plurality of physical network edges meet the one or more service requirements for the application:

deploying a new physical edge in the network that meets the one or more service requirements, and deploying the application to the new physical edge.

22. The non-transitory computer readable medium of claim 1, wherein determining whether the re-evaluated service measurements of the one of the plurality of physical network edges meet the one or more service requirements for the application includes, in part, determining whether execution of the application on the one of the physical network edges satisfies the one or more service requirements.

* * * * *